C. F. LAGANKE & J. A. SMITH.
COMPUTING MECHANISM.
APPLICATION FILED MAR. 27, 1906.

1,172,891.

Patented Feb. 22, 1916.
9 SHEETS—SHEET 1.

Fig.1.

Charles F. Laganke,
John A. Smith, Inventors

Witnesses

By

Attorney

C. F. LAGANKE & J. A. SMITH.
COMPUTING MECHANISM.
APPLICATION FILED MAR. 27, 1906.

1,172,891.

Patented Feb. 22, 1916.
9 SHEETS—SHEET 4.

Fig. 4.

Charles F. Laganke,
John A. Smith, Inventors

Witnesses
Jas. K. McCathran
Louis G. Julihn

By E. G. Siggers
Attorney

C. F. LAGANKE & J. A. SMITH.
COMPUTING MECHANISM.
APPLICATION FILED MAR. 27, 1906.

1,172,891.

Patented Feb. 22, 1916.
9 SHEETS—SHEET 9.

UNITED STATES PATENT OFFICE.

CHARLES F. LAGANKE AND JOHN ASBURY SMITH, OF HARRISBURG, PENNSYLVANIA, ASSIGNORS TO ELLIOTT-FISHER COMPANY, OF NEW YORK, N. Y., A CORPORATION OF DELAWARE.

COMPUTING MECHANISM.

1,172,891.      Specification of Letters Patent.      Patented Feb. 22, 1916.

Application filed March 27, 1906. Serial No. 308,279.

*To all whom it may concern:*

Be it known that we, CHARLES F. LAGANKE and JOHN A. SMITH, both citizens of the United States, residing at Harrisburg, in the county of Dauphin and State of Pennsylvania, have invented a new and useful Computing Mechanism, of which the following is a specification.

Our present invention relates to a computing mechanism designed more particularly for use in combination with a typewriting machine equipped with means whereby the computing device will be operated to compute a column total, as the column is typewritten upon a work sheet.

The primary object of the invention is to relieve the operating mechanism of the computing device of the burden ordinarily imposed upon it by the transfer or carrying mechanism. This end is attained by providing all except the lowest denominational member of the computing device with a transfer lever associated with a transfer motor and normally held in an inoperative position by a holding device, which, when operated by a denominational member, will release the transfer lever and permit the latter, under the impulse of the transfer motor, to advance a denominational member of higher order a single step or unit of movement.

A further object of the invention is to provide locking means controlled by the denominational members, but operated by means independent thereof, to lock the denominational members after the latter have been carried. To the attainment of this end, each transfer lever is provided with a locking portion, which, when the lever is moved under the impulse of its motor, engages and locks the wheel to which the lever transmits motion.

A still further object of the invention is to provide improved means for restoring the transfer levers to normal position upon the retraction of the typewriter carriage to begin the writing of a number. This object is accomplished by providing a rocker with an arm arranged to engage and retract the transfer levers and with a second arm formed with a segmental gear meshing with a reciprocatory rack bar having its front end arranged to be engaged by a part movable with the typewriter carriage to effect the retraction of the rack bar to swing the rocker and thus retract the transfer levers.

Another object is to provide positive means for returning the holding devices to their normal positions upon the retraction of the transfer levers. This end is attained by mounting the holding devices and transfer levers in such relation that when the rocker retracts the levers, it will positively move the holding devices into position to hold said levers against premature movement.

A further object of the invention is to simplify and render more efficient the resetting mechanism whereby the denominational members are reset to zero when a given computation has been completed and the total printed. To this end, the resetting lever is provided with a cam coöperating with a lever connected to the rack bar and so arranged that, by the movement of the resetting lever, the transfer mechanism will be restored to normal position preliminary to the resetting operation and also after the denominational members have been reset.

Other objects, subordinate to those enumerated, will appear more fully, as the necessity for their accomplishment is developed in the course of the succeeding description of the illustrated structure.

In the accompanying drawings.

As already stated, the computing device to be described is intended primarily for use in a combined typewriting and adding machine in which the keys of the typewriter cause the operation of a master means presentable in succession to the denominational members of the computing device. It is to be understood at the outset, however, that the computing mechanism, constructed in accordance with our present invention, is susceptible of use in relations other than those specified.

Referring more particularly to Figs. 1 and 7 to 19 inclusive, 1 indicates the laterally movable carriage of an Elliott-Fisher typewriter or billing machine exemplified in Letters Patent No. 573,868. As is well understood in the art, this carriage supports downwardly acting key-operated printing mechanism movable longitudinally and transversely of a flat platen upon which the work sheet is supported. For the purpose of this disclosure, however, a mere fragment of the carriage is shown, and the printing mechanism is wholly omitted.

In rear of the carriage 1 is disposed a register supporting bar 2 supported by brackets $3^a$ extending from the frame (not shown) of the typewriter. Adjustably mounted on the bar 2 is a computing device or register 3 comprising a casing 4 within which the computing and registering mechanism is assembled. This mechanism includes a series of denominational members $a$, $b$, $c$, $d$, $e$, $f$, $g$, $h$ and $i$, representing progressive denominations, as for instance, hundredths, tenths, units, tens, hundreds, thousands, ten-thousands, hundred-thousands, and millions, the member $b$ being preferably of double width in order to accommodate the decimal space. These denominational members are preferably in the form of toothed wheels, as shown, and while they may directly carry and display the digits by means of which the result of the computation is exhibited, they preferably engage and operate a series of digit carriers $a'$, $b'$, $c'$, $d'$, $e'$, $f'$, $g'$, $h'$ and $i'$ corresponding thereto in denominational position, and each bearing the digits "0" to "9" inclusive equidistantly spaced upon its periphery. A single digit on each of these wheels $a'$, $b'$, etc., is exhibited before a sight opening 5 in the casing 4 of the computing device. These wheels may therefore be said to constitute registering members, since the exhibition, in different denominations, of the digits carried thereby, constitutes the registration of the result of a given computation.

The primary wheels or denominational members $a$, $b$, etc., are directly engaged by a master actuator or wheel 6 operated in any suitable manner and presented to successive denominational members of the computing device by the relative lateral movement of said device and the actuator.

In that embodiment of the invention which is contemplated by the present disclosure, the computing device is held stationary on the bar 2, and the master wheel 6 moves laterally with the carriage 1 to dispose it opposite the denominational member which corresponds in denominational position to the denominational position of the printing point of the typewriter with respect to the column to be recorded and computed. When the master wheel is thus positioned, it is caused to operate upon the depression of a numeral key of the typewriter for the purpose of moving the proper denominational member a number of increments or units of movement corresponding to the numerical value of the digit printed. As the primary wheels or denominational members $a$, $b$, etc., are thus operated, each registering wheel or member $a'$, $b'$, etc., will make nine-tenths of a complete rotation, independently of the other of said wheels, to present its digits successively before the sight opening 5.

When the number registered by any wheel reaches the limit of the denominational value of such wheel, it becomes necessary to transfer or carry the value thus accumulated to the wheel of next higher order or denomination. Thus, assuming the units wheel to be given nine increments of movement, causing the presentation of the digit "9" opposite the sight opening, the next or tenth increment of movement must present the "0" on said wheel before the opening and must cause the automatic advance of the tens wheel a single increment or step to present the digit "1" before the sight opening, the presentation of the digits "0" and "1" in the units and tens orders or denominations effecting the registration of the number "10," which is the limit of value of the units denomination, and the unit of value of the tens denomination.

*The transferring or carrying mechanism.*—The transferring or carrying mechanism is that organization whereby when a given registering wheel moves from "9" to "0," the adjacent wheel of higher order or denomination will be automatically advanced a single increment.

In rear of the primary wheels is disposed a transverse supporting rod 7 upon which are fulcrumed a series of independent transfer levers 8, one of these levers being arranged opposite each of the primary wheels, with the exception of the wheel a, for which no lever is provided. The transfer levers are of irregular form and each is provided at its front end with a locking arm 9 and a guide arm 10, the latter being disposed a considerable distance below the arm 9 and movable in one of a series of guide openings or notches 11 in the guide-bar 12 extending across the casing 4.

Pivoted in the locking arm 9 of each transfer lever 8 and depending therefrom, is a transfer dog 13, the lower end of which is designed to extend over and engage one of the peripheral teeth of the adjacent primary wheel, the front face of the dog being curved longitudinally so that that part of the dog which engages the primary wheel has the form of a projection or tooth. The rear arm 14 of each transfer lever 8 extends downwardly from the fulcrum thereof and terminates in a hook 15 to which is attached one end of a spring 16 having its opposite end attached to the rear wall of the casing as by a hook 17. It will be understood that a spring 16 is provided for each of the transfer levers and that they constitute transfer motors each of which tends constantly to swing a transfer lever for the purpose of advancing a primary wheel or denominational member through the medium of the transfer dog 13 carried by the lever and extended over a tooth of the wheel. Normally, however, the transfer levers are held in their elevated or retracted positions by holding devices or detents 18 in the form of thin metal plates alternating with the transfer levers and mounted to swing from a bar 19 extending transversely across the casing at a point above the levers 8.

One of the holding devices 18 is appropriated to each transfer lever and is disposed at the right hand side thereof in order to permit a contact plate or lug 20, extending forwardly from the holding device or plate 18, to occupy a position between two primary wheels, the wheel at the left hand side of the contact plate being that wheel which is disposed opposite to and arranged to be carried or advanced by the transfer lever held by the holding device or detent. At the lower end of each holding device is located a laterally extending holding lug 21 normally disposed under the lower edge 22 of a transfer lever and yieldingly held against a stop shoulder 23, formed on the latter, by a spring 18$^a$ having its front end attached to a lug 18$^b$ on the plate 18 and secured at its rear end to one of a series of hooks 18$^c$ carried by a fixed bar 18$^d$ extending transversely across the casing 4.

Figure 1:
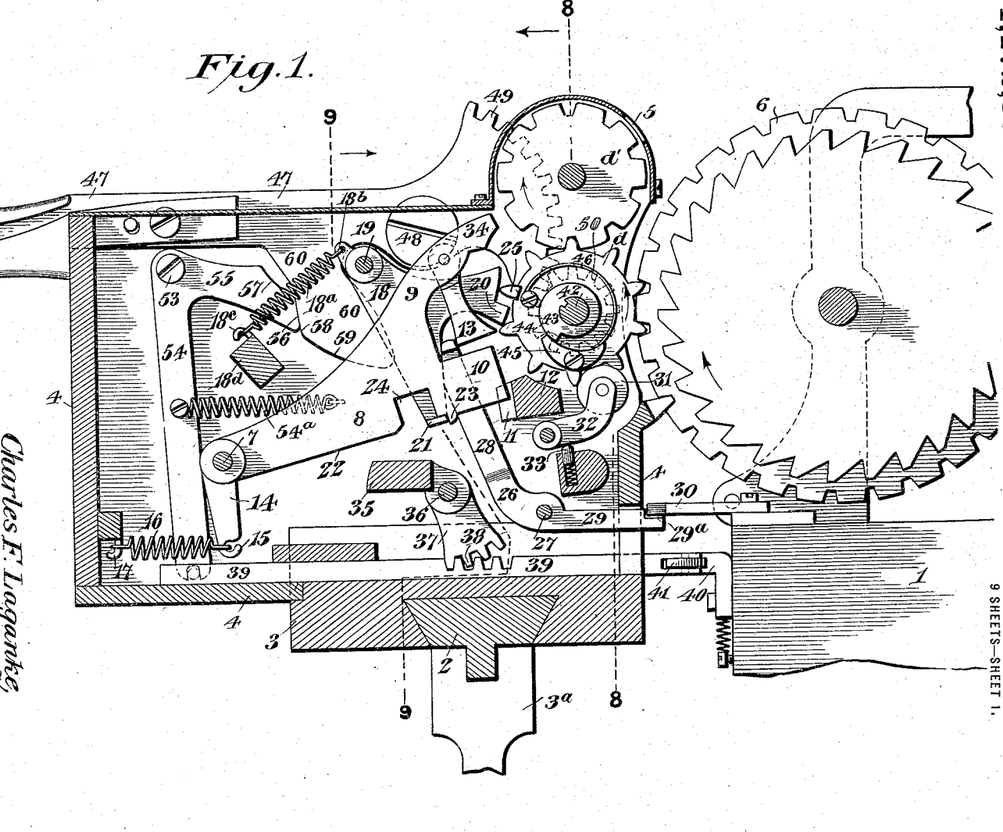
—Figure 1 is a vertical longitudinal sectional view through the computing device and a portion of its operating mechanism, the parts being shown in normal position with a digit carrier exhibiting "9" at the sight opening.
Figure 2:
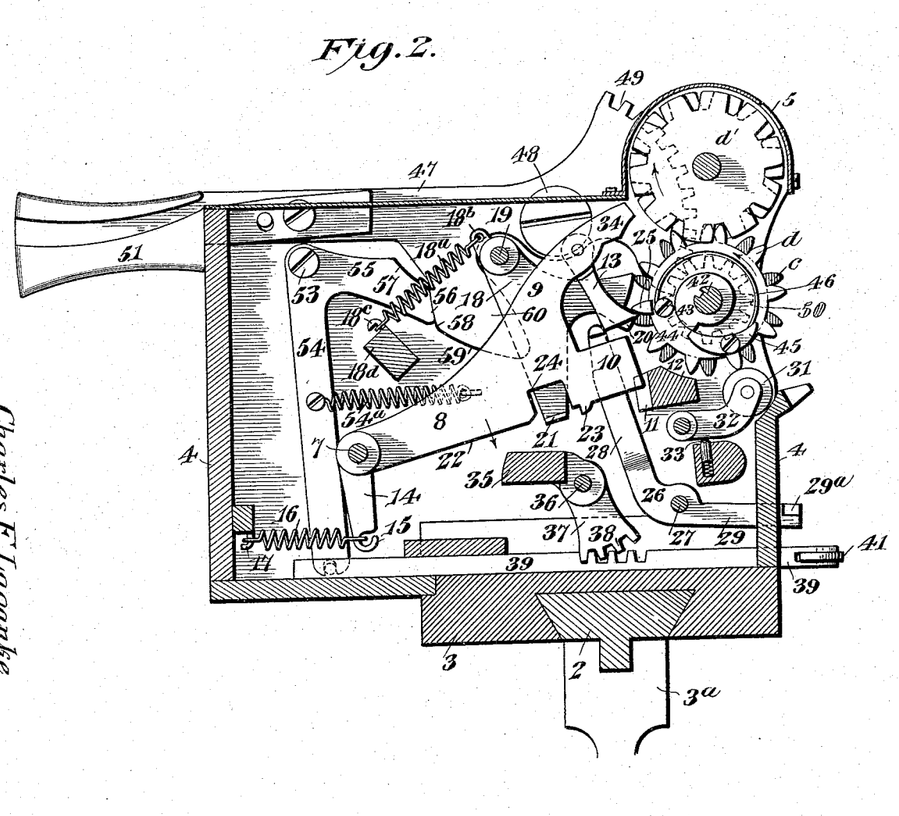
Fig. 2 is a similar view of the computing device, showing the digit carrier in the act of moving from "9" to "0", the holding device having been moved by a denominational member to release the transfer lever.

In rear of that portion of the edge 22 with which the holding lug is normally engaged, as shown in Fig. 1, the transfer lever is formed with a comparatively deep notch or recess 24. The notch 24 is of sufficient width to receive the holding lug 21, so that, when the latter is moved back opposite the notch by the swinging of the holding device 18, the front end of the transfer lever 8 will be permitted to drop under the impulse of a transfer motor 16 for the purpose of advancing a primary wheel and the corresponding registering wheel a single increment or step. We have already seen that this movement of the transfer lever is designed to advance a given primary wheel when the wheel of next lower order moves from "9" to "0." To accomplish the desired result, therefore, it is simply necessary to cause such wheel of lower order to swing back the holding device 18 at the proper time and thus release for operation the transfer lever appropriated to the wheel of next higher order. For this purpose each of the primary wheels, except the wheel $i$, is provided upon the left hand side face of one of its teeth with a transfer lug or projection 25 movable in a path obstructed by the contact plate 20 of the holding device 18, which controls the operation of the transfer lever of next higher order or denomination. Thus, as a given primary wheel moves from the "9" position, shown in Fig. 1, (the corresponding registering wheel exhibiting "9" at the sight opening 5) the transfer lug 25 thereon will engage the adjacent contact plate 20 and swing the holding device 18 to the position shown in Fig. 2, thus bringing the holding lug 21 opposite the notch 24 and releasing the transfer lever. The transfer motor 16 will immediately act to move the transfer lever from the position shown in Fig. 2 to that shown in Fig. 3, thus causing the dog 13, carried by the lever, to move the next higher wheel a single increment for the purpose of transferring to it the value accumulated upon a wheel of lower denomination. At this point attention may be directed to the fact that the transfer dogs 13 are pivotally mounted in the levers 8 in order that they may normally occupy positions in rear of and out of engagement with the primary wheels so that said dogs may present no resistance to the movement of the wheels as they are being directly operated by the master wheel 6. To insure the engagement of the dogs with the wheels at the proper time, a series of vibrators 26 are mounted upon a shaft 27 extending transversely across the casing 4 adjacent to the lower front corner thereof. Each of these vibrators is provided with a vertical arm 28 disposed behind and arranged to swing a transfer dog 13, and with a horizontal forwardly extending arm 29 extended through the front wall of the casing 4 and having a pointed upper edge 29ª, see Fig. 12.

The front ends of the vibrators 26 are depressed successively by an actuator 30 movable with the carriage 1 of the typewriter. The dogs 13 normally occupy the positions shown in Fig. 1, but, as the master wheel 6 moves out of engagement with the primary wheel served by a given dog, said dog is moved into engagement with the primary wheel by the vibrator 26 operated as before stated by the actuator 30 which moves laterally with the master wheel. The dog is thus brought into engagement with the primary wheel to the left of the one to be actuated by the master wheel, so that, should the directly operated wheel move from "9" to "0", the transfer dog of the wheel of next higher order will be in position to operate the same upon the release of the transfer lever.

To insure accurate alinement of the digits opposite the sight opening and to resist possible reverse rotation of the wheels, a series of locators 31 are provided for the several primary wheels. These locators are in the form of rollers mounted at the outer ends of swinging arms 32 urged toward the wheels by spring pressed plungers 33.

Figure 3:
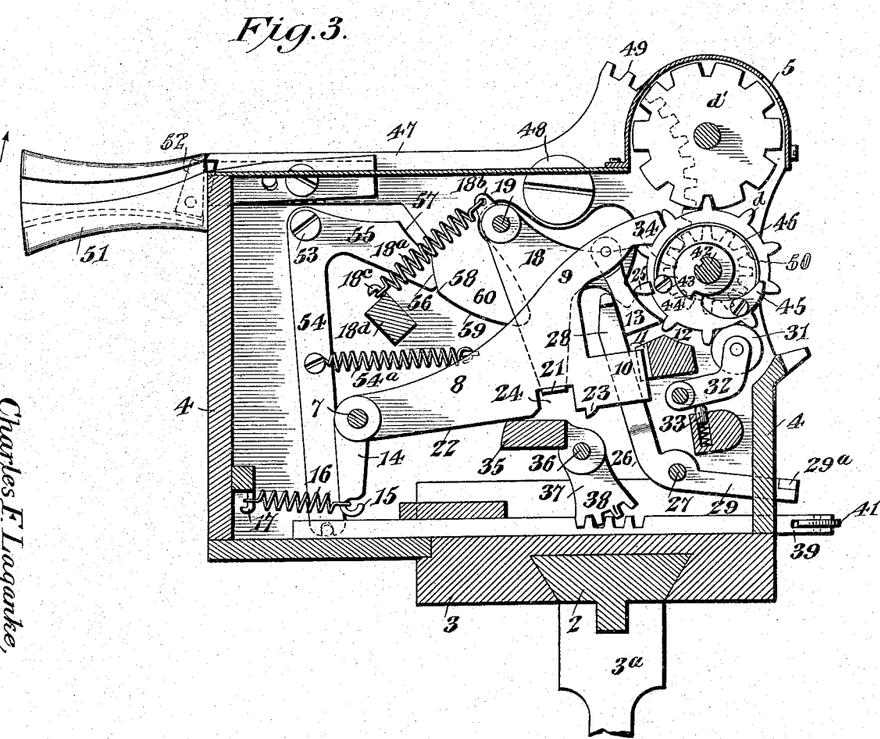
Fig. 3 is a similar view, showing the positions assumed by the parts when the digit carrier has completed its movement and is exhibiting "0" at the sight opening, the transfer lever having moved down to carry the member engaged thereby.

*The means for automatically locking the wheels when carried.*—When a primary wheel has been operated by a transfer lever, it is desirable to positively lock the wheel against further movement. To accomplish this object, each transfer lever 8 is provided with a locking portion 34 formed to fit between two teeth of the adjacent primary wheel when the lever occupies its depressed position. When a transfer lever has carried a primary wheel, its locking portion 34 will have moved into locking engagement with the wheel, as shown in Fig. 3. Thus the levers 8 will be seen to constitute not only transfer levers, but locking levers as well, and the computing mechanism may therefore be said to comprehend locking devices which are operated by the motors 16 and controlled by the wheel operated holding devices or detents 18.

Figure 4:
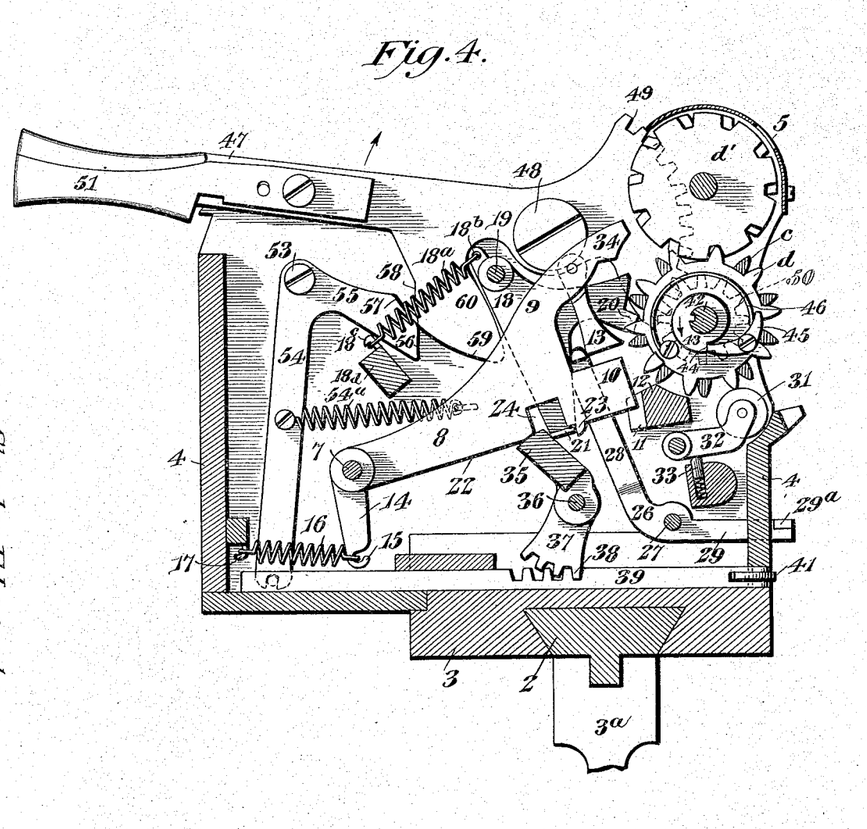
Fig. 4 is another sectional view, showing the positions assumed by the parts after slight movement of the resetting lever, a transfer lever and its holding device having been restored to normal position by the rocker.

*The mechanism for restoring the transferring and locking levers and detents to normal position and for restoring the energy expended by the transfer motors.*—Below the transfer levers 8 a rocker 35 is mounted to swing from a bar 36 extending across the casing 4 adjacent to the bottom thereof and in rear of the vibrators 26. When the transfer levers or any of them are moved down to their depressed positions, as shown in Fig. 3, their lower edges 22 are moved close to or in contact with the rocker, so that when the latter is swung, as indicated in Fig. 4, the levers will be raised or retracted to their normal positions. Having elevated the transfer levers, the rocker will come in contact with the lower ends of the holding devices or detents 18 associated with said levers and will move the same positively to their normal positions, see Fig. 4, if, for any reason, the springs 18ª should fail to return the detents.

Forming a part of the rocker 35 and depending from the bar 36, is an arm 37 having a segmental rack 38 formed at its lower end. The rack 38 meshes with the teeth of a rack bar 39 slidably mounted at the bottom of the casing 4 and projected beyond the front end thereof to dispose it in the path of movement of an actuator 40 movable with the typewriter carriage 1. During the retraction of the carriage, the actuator 40 operates the slide or rack bar 39 to operate the rocker and thus restore the transfer levers to their elevated positions and to simultaneously unlock the wheels in order that another number may be added to the computation already effected.

Figures 10, 11, 12, 13, 20, 21:
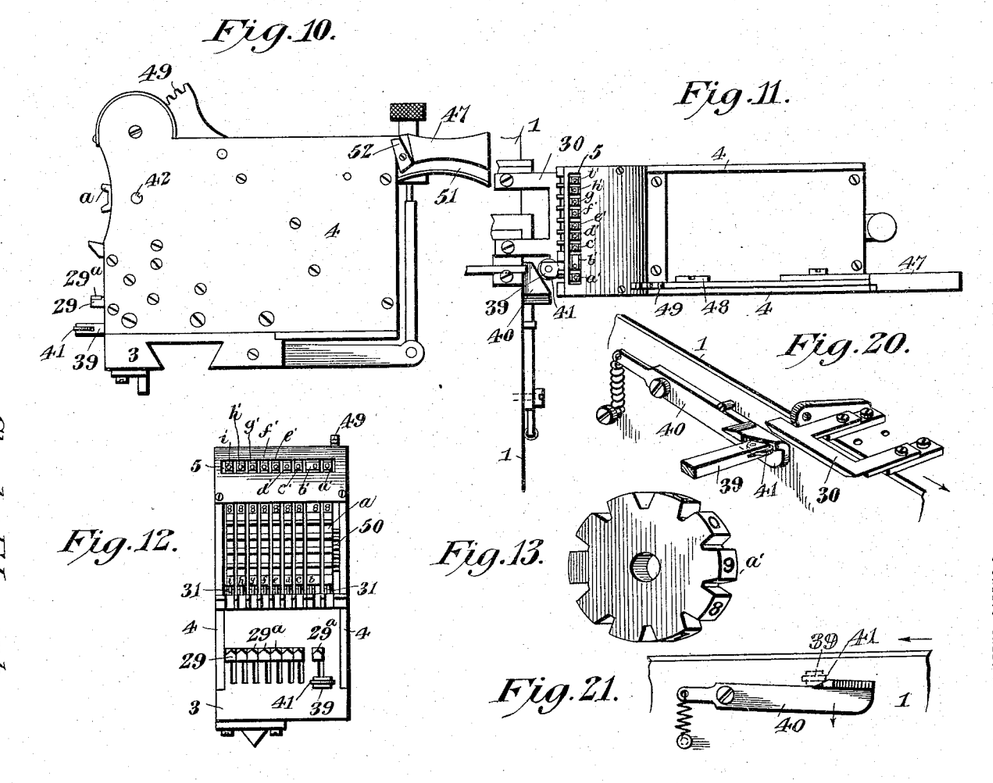
Fig. 10 is a side elevation of the computing device
Fig. 11 is a top plan view thereof.
Fig. 12 is a front elevation of the same.
Fig. 13 is a perspective view of one of the digit carriers or registering wheels.
Fig. 20 is a perspective view illustrating the operation of the rack bar 39 by the actuator 40 during the retraction of the typewriter carriage.
Fig. 21 is an elevation showing how the actuator 40 yields to prevent it from operating the rack bar during the advance of the carriage in the direction of letter spacing.
Figure 14:
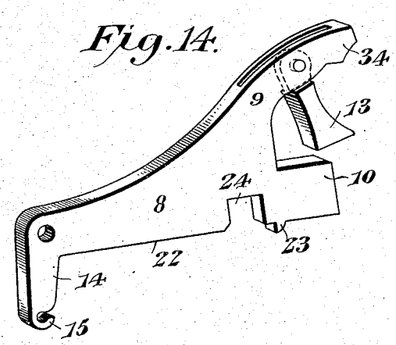
Fig. 14 is a detail perspective view of a transfer lever and its dog.
Figure 15:
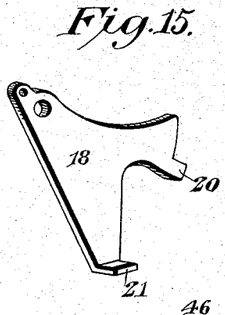
Fig. 15 is a similar view of one of the holding devices or detents.
Figure 16:
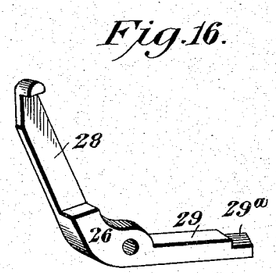
Fig. 16 is a detail perspective view of one of the transfer dog vibrators.
Figure 17:
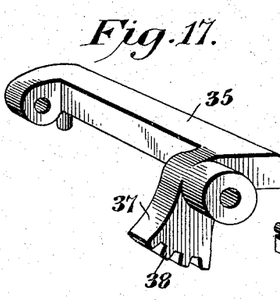
Fig. 17 is a similar view of the rocker for retracting the transfer levers.
Figure 18:
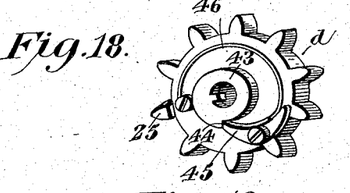
Fig. 18 is a detail perspective view of one of the primary wheels or denominational members, showing the relation of a resetting cam to a pawl.
Figure 19:
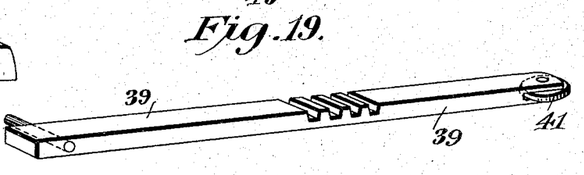
Fig. 19 is a detail perspective view of the rack bar for operating the rocker.

For the purpose of reducing the friction between the rack bar 39 and the actuator 40, the former is provided at its outer end with an antifriction roller 41, as shown in Fig. 19. The actuator 40 is pivotally mounted, as shown in Fig. 21 and is designed to yield as indicated in said figure, when it engages the slide 39 during the forward or letter space movement of the carriage. When the carriage is retracted, however, the rack bar is moved back in the manner already stated.

*The means for resetting the registering wheels to zero.*—The primary wheels a, b, etc., are mounted upon a normally stationary shaft 42 upon which are fixed a series of resetting cams 43 alternating with the primary wheels. Each of the cams 43 is formed with a shoulder 44 which normally occupies the position shown in Fig. 1 and is alined with the other shoulders of the series. Coöperating with each resetting cam is a resetting dog or pawl 45 pivoted on the left hand side face of the primary wheel at the right of the cam, the engaging end or beak of the pawl being urged toward the periphery of the cam by the spring 46. As the primary wheels rotate upon the shaft 42, during the operation of the computing device, the dogs 45 travel upon the peripheries of the resetting cams, which remain stationary, and when a wheel makes a complete rotation and arrives at the "0" position, the beak of the dog drops down in advance of the shoulder 44 of the adjacent cam, see Fig. 3. As the wheels will be in various registering positions at the completion of a given computation, the dogs will occupy various positions relative to the cams. Obviously, however, if the shaft 42 is rotated in the direction of the arrow in Fig. 4, the shoulders of the cams rotating therewith will pick up or engage the dogs, regardless of the locations of the latter, and being thus connected with the wheels, will rotate the same until they are restored to zero or reset. To effect this resetting operation, we employ a resetting lever 47 pivoted at 48 to the right hand side of the casing and provided at its front end with a toothed segment 49 meshing with a resetting pinion 50 keyed or otherwise secured to the shaft 42, see Figs. 1, 7 and 8. The resetting lever 47 is equipped with a latch lever 51 provided with a pivoted catch 52, see Fig. 10, which normally engages the casing of the computing device and retains the resetting lever in fixed position.

Figure 5:
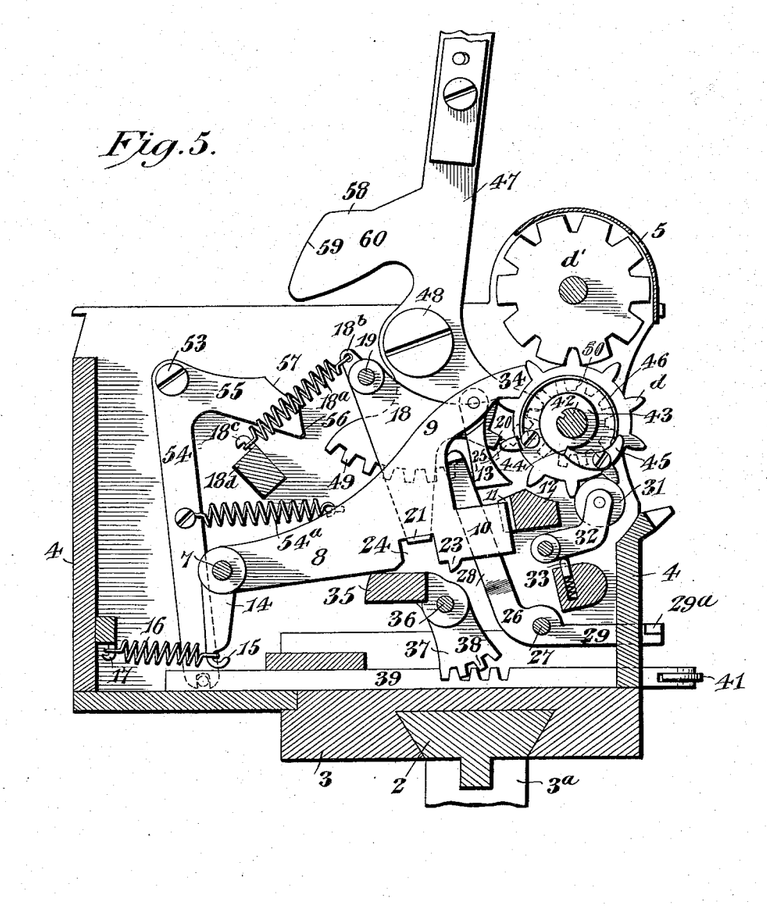
Fig. 5 is a similar view, showing the positions assumed by the parts when the resetting lever has reached the limit of its upward movement, the movement of the denominational member from "9" to "0" having caused the depression of the transfer levers.

It will now be seen, by reference to Figs. 3, 4 and 5, that the resetting lever 47 may be swung up to effect slightly more than a complete rotation of the shaft 42 and the cams 43 to restore the primary wheels $a$, $b$, etc., and the registering wheels $a'$, $b'$, etc., to their normal or zero positions. It may be, however, that when it is desired to reset the wheels, certain of the transfer levers 8 will occupy their depressed positions, in which positions, as we have already seen, they positively lock the primary wheels $a$, $b$, etc. Obviously, therefore, these levers must be elevated or retracted to unlock the wheels before the latter can be reset.

While the return of the transfer levers may be effected by the retraction of the carriage 1 of the typewriter through the medium of the actuator 40 coacting with the rack bar 39, as previously described, it is desirable to have the computing device complete in itself, since it may be utilized in various relations other than that specified, that is to say, in machines other than combined typewriting and calculating machines. Therefore, the resetting mechanism includes means whereby the wheels will be automatically unlocked preliminary to the resetting thereof, and again unlocked after the resetting operation has been completed, it being observed that, as the wheels move from "9" to "0" during the resetting operation, the transfer levers will be depressed, thus necessitating the unlocking of the wheels after, as well as before, resetting, in order that they may be free to be operated by the master wheel.

Fulcrumed in the computing device casing at 53 is an angular lever 54 having a loose pivotal connection at its lower end with the rack bar 39. At its upper end the lever 54 has a forwardly extending arm 55 provided with angularly related cam faces 56 and 57, designed to coöperate with the cam faces 58 and 59 of a cam 60 formed integral with and depending from the resetting lever 47, see Fig. 1.

At the beginning of the resetting operation, certain of the combined transferring and locking levers will occupy the depressed positions shown in Fig. 3. When the operator desires to reset the wheels, he grips the extended end or handle of the resetting lever 47, and having effected the release thereof by the operation of the latch lever 51, swings the resetting lever in the direction of the arrow in Fig. 3. This movement of the lever causes the cam 60 to swing the lever 54 from the position shown in Fig. 3 to that shown in Fig. 4, for the purpose of retracting the rack bar 39 and operating the rocker 35 to retract or elevate the transfer levers 8 and to restore the holding devices 18 to normal position, see Fig. 4.

Continued upward movement of the resetting lever to the position shown in Fig. 5 will permit the lever 54 and the associated parts, including the rocker 35, to move back to their normal positions under the impulse of the spring $54^a$, and will also cause the primary wheels $a$, $b$, etc., and the registering wheels $a'$, $b'$, etc., to be reset to the zero position. Incidental to the resetting of the primary wheels, the transfer levers 8 will be thrown down by reason of the fact that, as the primary wheels move from "0" to "9", the holding devices will be moved back to allow the transfer levers to drop.

Figure 6:
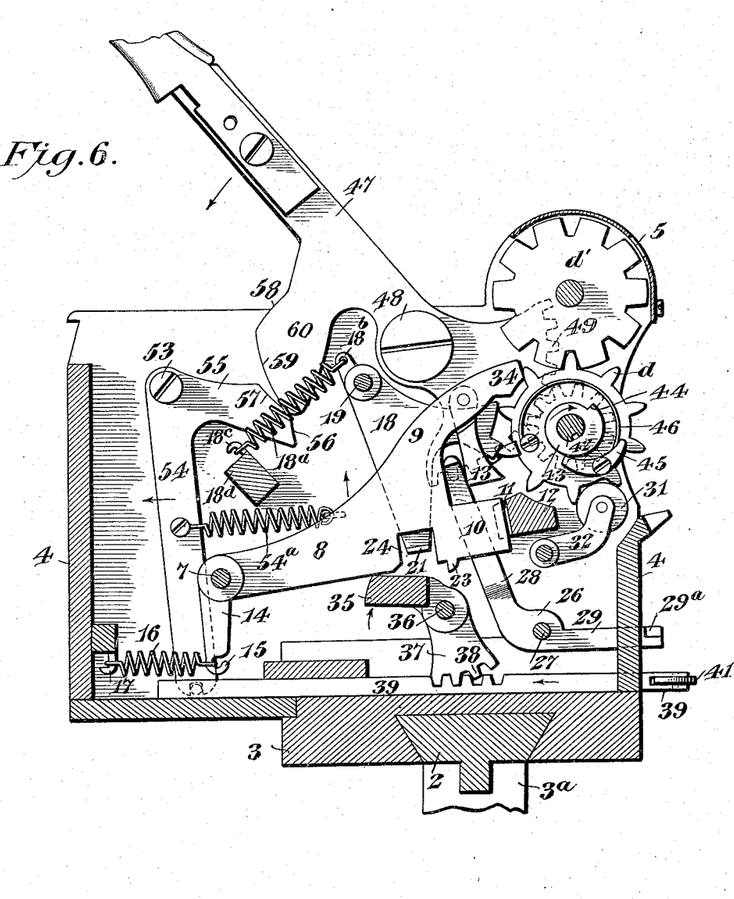
Fig. 6 is another sectional view, showing the positions assumed by the parts when the resetting lever has been partially retracted, the transfer levers being shown in the act of returning to their normal positions.
Figure 7:
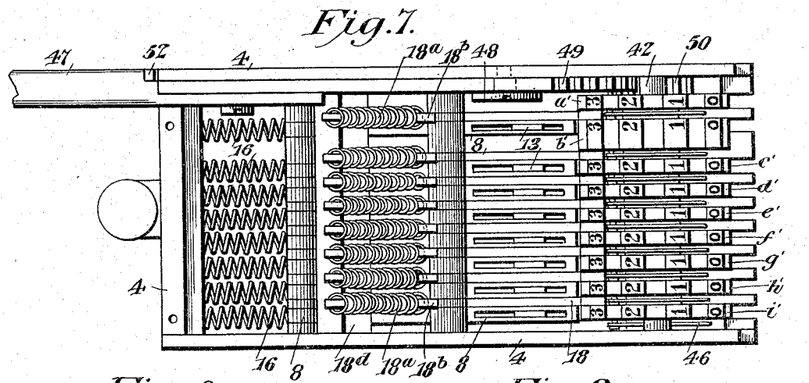
Fig. 7 is a plan view of the computing device with the top removed.
Figure 8:
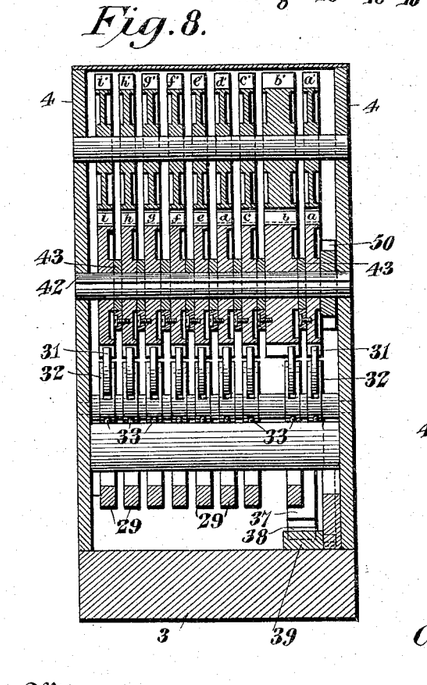
Fig. 8 is a section on the line 8—8 of Fig. 1.
Figure 9:
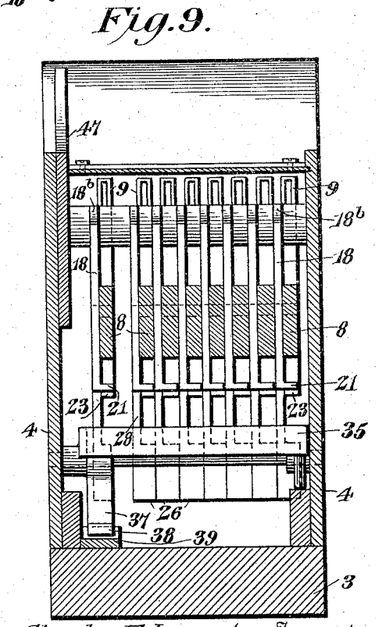
Fig. 9 is a section on the line 9—9 of Fig. 1.

When the upward movement of the resetting lever has been completed, the wheels will have been reset, and the parts will occupy the positions shown in Fig. 5. The transfer lever is now swung back in the direction of the arrow in Fig. 6, the wheels being held stationary by the locators 31, while the shaft 42 and the cams thereon are turned back. During the return of the lever 47, the cam 60 thereon will engage the arm 55 of the lever 54, and continued movement of the resetting lever will cause the lever 54 to swing for the purpose of again operating the rocker 35 to elevate the transfer levers 8 and thus effect the unlocking of the wheels after the latter have been reset in order to permit them to be operated for the purpose of beginning a new computation.

As the lever 47 reaches its normal position, the lever 54 is permitted to swing back in order to restore the rack bar 39 and the rocker 35 to the position shown in Fig. 3, after which the mechanism may be again operated in the manner described to effect another computation.

It is believed that the preceding description is sufficiently complete to enable those skilled in the art to construct and use the illustrated mechanism. It should be understood, however, that the structure shown is susceptible of extended modification within the scope of the invention defined by the appended claims.

What we claim is:—

1. In a computing mechanism, the combination with a series of denominational members, of a series of transfer members therefor, said members being horizontally disposed and pivotally mounted at their rear ends, a transfer motor for each transfer member, and a series of holding members mounted to swing from a point above each transfer member and normally engaging the under sides of said members, each of said holding devices being movable by a denominational member to release a transfer member.

2. In a computing mechanism, the combination with a series of peripherally toothed denominational members, of a series of transfer levers mounted to swing from their rear ends and each having a locking portion located at the front end thereof and disposed to engage an interdental space of a denominational member to lock said member against movement in either direction, a transfer dog carried by each transfer lever and disposed to engage a denominational member, a holding device for each transfer lever, said holding device being movable by a denominational member to release a transfer lever, and a transfer motor for each transfer lever.

3. In a computing mechanism, the combination with a series of denominational members, of a series of transfer levers each comprising a horizontal arm extended forwardly from the fulcrum thereof and a vertical arm extended downwardly from the fulcrum, a transfer motor connected to the vertical arm of the lever, a vertically disposed transfer dog carried by the horizontal arm of the transfer lever and disposed to engage a denominational member, a support located above the horizontal arms of the transfer levers, holding devices pendent from said support and disposed normally to engage the lower edges of the several transfer levers, each of said holding devices being movable by a denominational member to release a transfer lever and thus permit the horizontal arm of said lever to drop down under the impulse of gravity assisted by a transfer motor.

4. In a computing mechanism, a denominational member, a transfer member therefor, a holding device for the transfer member, a second denominational member arranged to operate the holding device to release the transfer member, and retracting means movable to retract the transfer member and having continued movement to retract the holding device.

5. The combination with a typewriter including a carriage, of a computing device including a plurality of denominational members, a series of transfer devices for said members, a transfer motor for each transfer device, and mean operated by the typewriter carriage to restore the energy expended by the transfer motors.

6. The combination with a typewriter including a carriage, of a computing device including a plurality of denominational members, a series of transfer devices for said members, a transfer motor for each transfer device, holding devices each normally holding a transfer member inactive and movable by a denominational member to release a transfer member, and means operated by the typewriter carriage to restore the energy expended by the transfer motors.

7. The combination with a typewriter including a carriage, of a computing device including plurality of denominational members, transfer mechanism for said members, said transfer mechanism including a transfer motor, and means automatically operative upon the retraction of the typewriter carriage to reset the transfer mechanism and to restore the energy expended by the transfer motor.

8. The combination with a typewriter including a carriage, of a plurality of denominational members, a transfer device for one of said members, a motor for moving said transfer device, a holding device normally holding the transfer device inactive and movable to release the transfer device, and means operated by the typewriter carriage to return the holding device to normal position.

9. The combination with a typewriter including a carriage, of a denominational member, transfer mechanism therefor including a motor, a movable holding device normally preventing the operation of the transfer mechanism, means for moving the holding device to permit the transfer mechanism to operate, and means automatically operative upon the retraction of the typewriter carriage to restore the transfer mechanism and holding device to their normal positions.

10. The combination with a typewriter including a carriage, of a series of denominational members, a series of transfer devices therefor, means including a transfer motor for operating the transfer devices, a series of holding devices for the transfer devices, said holding devices being movable by the denominational members, and resetting mechanism operative to reset the transfer devices, holding devices, and denominational members and to again reset the holding devices displaced by the denominational members during the resetting of the latter.

11. The combination with a typewriter including a carriage, of a series of denominational members, transfer members therefor, transfer dogs movably mounted on the transfer members, motors for moving the transfer members, holding devices normally retaining the transfer members against movement and arranged to be operated by the denominational members, means operated by the typewriter carriage to reset the transfer members and holding devices, and means also operated by the typewriter carriage to move the transfer dogs into engagement with the denominational members.

12. In a computing mechanism, a denominational member, a transfer member therefor, a holding device for the transfer member, a second denominational member arranged to operate the holding device, and retracting means movable to engage the transfer member and holding device respectively and arranged to retract first the transfer member and then the holding device.

13. In a computing mechanism, a denominational member, a transfer member therefor, a rocker movable to retract the transfer member and provided with a segmental rack, and a reciprocatory rack bar meshing with said rack and movable to operate the rocker.

14. The combination with a typewriter carriage, of a computing device including a plurality of denominational members, transfer mechanism for said members including a transfer motor controlled by a denominational member, and means operated by the movement of the typewriter carriage to restore the energy expended by the transfer motor.

15. The combination with a typewriter carriage, of a computing device including a plurality of denominational members, locking mechanism for said members including a motor, and means operated by the movement of the typewriter carriage for restoring the energy expended by the motor.

16. The combination with a typewriter carriage, of a computing device including a plurality of denominational members, combined transferring and locking mechanism for said members including a motor, and means operated by the movement of the typewriter carriage for restoring the energy expended by the motor.

17. The combination with a typewriter carriage, of a computing device including a plurality of denominational members, a swinging transfer member, a motor therefor, and means operated by the movement of the typewriter carriage for restoring the energy expended by the motor.

18. The combination with a typewriter carriage, of a denominational member, a transfer member therefor, a movable holding device for the transfer member, a second denominational member arranged to move the holding device to release the transfer member, a motor for moving the transfer member when released, and means operated by the movement of the typewriter carriage for restoring the energy expended by the motor.

19. The combination with a typewriter carriage, of a denominational member, transfer mechanism therefor including a transfer motor, a movable holding device normally preventing the operation of the transfer mechanism, means for moving the holding device to permit the transfer mechanism to operate, and means operated by the movement of the typewriter carriage for restoring both the transfer mechanism and holding device to their normal positions.

20. The combination with a typewriter carriage, of a denominational member, a transfer lever having a pivoted transfer dog disposed to engage and move the denominational member, a transfer motor for the transfer member, means including a second denominational member for controlling the operation of the transfer member, and means operated by the movement of the typewriter carriage for restoring the transfer member to normal position.

21. The combination with a typewriter carriage of a denominational member, a transfer lever provided with a pivoted transfer dog, a motor spring for the transfer lever, a pivoted holding device normally retaining the transfer lever in its inoperative position, a second denominational member arranged to move the holding device to release the transfer lever, and means operated by the movement of the typewriter carriage for restoring the transfer lever to its normal position.

22. The combination with a series of denominational members, of motor operated locking mechanism for the members, and member resetting mechanism including means for unlocking the denominational members both before and after the resetting thereof.

23. The combination with a series of denominational members, of locking mechanism therefor, resetting mechanism including a resetting lever, a cam carried thereby, and means operated by the cam for unlocking the denominational members both before and after the resetting thereof.

24. The combination with a series of denominational members, of locking mechanism therefor, a movable cam, and means operated by the movement of the cam in either direction for unlocking the denominational members.

25. The combination with a series of denominational members, of locking mechanism therefor, an oscillatory resetting lever for the denominational members, and means operated by the movement of the lever in either direction for unlocking the denominational members.

26. The combination with a series of denominational members, of transfer mechanism therefor, an oscillatory resetting lever for the denominational members, and means operated by the movement of the resetting lever in either direction for restoring the transfer mechanism to its normal position.

27. The combination with a series of denominational members, of combined transfer and locking levers therefor, a retracting rocker common to said levers, a slide connected to the rocker, a lever connected to the slide, a resetting lever for the denominational members, and a cam carried by the resetting lever and coöperatively related to the lever connected to the slide.

28. The combination with a typewriter including a carriage, of a computing device including a plurality of denominational members, a series of transfer devices for said members, a transfer motor for each transfer device, and means for restoring the energy expended by the transfer motors, said means being under the control of the typewriter carriage.

29. The combination with a typewriter including a carriage, of a computing device including a plurality of denominational members, a series of transfer devices for said members, a transfer motor for each transfer device, holding devices each normally holding a transfer member inactive and movable by a denominational member to release the transfer member, and means for restoring the holding devices to normal position, said means being under the control of the typewriter carriage.

30. The combination with a computing device including a series of denominational members, of a series of transfer dogs, a master actuator common to the several denominational members, and means for holding the transfer dogs in engagement with the several denominational members of higher order than the one with which the master actuator is engaged.

31. The combination with a computing device including a series of denominational members and a series of transfer dogs therefor, of a series of devices each arranged to move one of the transfer dogs into engagement with one of the denominational members, and means for operating said devices in succession and for retaining the devices in their operated positions during the accumulation of a number in the computing device.

32. The combination with a typewriter including the carriage, of a computing device including a series of denominational members and a series of transfer dogs therefor, of a series of devices each arranged to move one of the transfer dogs into engagement with one of the denominational members, and means, including the typewriter carriage, for operating said devices in succession and for retaining the devices in their operated positions during the accumulation of a number in the computing device.

In testimony, that we claim the foregoing as our own, we have hereto affixed our signatures in the presence of two witnesses.

CHARLES F. LAGANKE.
JOHN ASBURY SMITH.

Witnesses:
JOHN R. GEYER,
E. A. KELNY.

Copies of this patent may be obtained for five cents each, by addressing the "Commissioner of Patents. Washington, D. C."